(12) United States Patent
Eichwald

(10) Patent No.: US 7,144,042 B2
(45) Date of Patent: Dec. 5, 2006

(54) SEAT BELT DEVICE

(75) Inventor: Tor Vopn Eichwald, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 10/820,299

(22) Filed: Apr. 9, 2004

(65) Prior Publication Data

US 2004/0239093 A1 Dec. 2, 2004

(30) Foreign Application Priority Data

Apr. 14, 2003 (EP) .................................. 03008559

(51) Int. Cl.
*B60R 22/18* (2006.01)
(52) U.S. Cl. .................... 280/805; 280/801.1; 297/470
(58) Field of Classification Search ................ 280/805, 280/801.1; 297/470, 471, 483
See application file for complete search history.

(56) References Cited

U.S. PATENT DOCUMENTS

| | | | | |
|---|---|---|---|---|
| 5,050,906 A | * | 9/1991 | Kneip | ........................ 280/805 |
| 6,213,510 B1 | * | 4/2001 | Suyama | ....................... 280/805 |
| 6,400,145 B1 | * | 6/2002 | Chamings et al. | ..... 324/207.26 |
| 6,502,860 B1 | * | 1/2003 | Siegfried et al. | ......... 280/801.1 |
| 6,561,300 B1 | * | 5/2003 | Sakamoto et al. | .......... 180/273 |
| 6,679,524 B1 | * | 1/2004 | Greib et al. | ............. 280/801.1 |
| 6,776,056 B1 | * | 8/2004 | Garver et al. | ................. 73/862 |

\* cited by examiner

*Primary Examiner*—David R. Dunn
(74) *Attorney, Agent, or Firm*—Frank A. MacKenzie

(57) ABSTRACT

A device for use together with a seat belt (3) of a seat in a vehicle (6), comprising a sensor (2) for measuring tension in the seat belt and a member (4) for limiting the load transferable by the seat belt, the seat belt tension sensor being arranged to provide information based on which an airbag intended for said seat may be disconnected. One of either the seat belt tension sensor (2) or the load limiter member (4) is connectable to a first end of the seat belt (3) and the other of the seat belt tension sensor and the load limiter member is connectable to the vehicle (6), the seat belt tension sensor and the load limiter member being connected to each other so that at least a part of the seat belt tension sensor (2) and a part of the load limiter member (4) overlap with each other.

14 Claims, 4 Drawing Sheets

SEAT BELT DEVICE

FIELD OF THE INVENTION

The present invention relates to a device for use together with a seat belt of a seat in a vehicle and to a vehicle comprising such a device.

BACKGROUND OF THE INVENTION

Today vehicles, such as cars, have a number of safety devices to thereby fulfil various safety regulations. For example, the passenger seat of a car is often provided with an airbag. However, the passenger seat is often used to receive a child seat and a child therein and in that case the airbag has to be disconnected so that it does not release and cause injury to the child in the case the vehicle is involved in a traffic accident.

For fulfilling this requirement of a so-called "smart airbag", the passenger seat is provided with a seat belt having a seat belt tension sensor. The seat belt tension sensor is used to detect whether there is an adult passenger or a child seat located on the seat. By measuring the tension in the seat belt, or more exactly by measuring whether the tension exceeds a predetermined value or not, it is possible to obtain an indication that the seat belt tension could have been caused by a child seat being mounted on the passenger seat by means of the seat belt and, accordingly, disconnect the airbag. In combination with a seat belt tension sensor, a pillow integrated in the passenger seat may be used for measuring the weight applied to the seat by a passenger or a child seat.

Further, load limiters are used for ensuring that the tension in the seat belt does not exceed a predetermined value. This is important for ensuring that, in case of an accident, a passenger using the seat belt will not be subjected to a load exceeding a certain value. If the load transferred by the seat belt to the passenger is too great it could be harmful to the passenger. Previously, such load limiters have been integrated in the seat belt by way of folded and sewn parts of the seat belt made from a textile material. Recently, a new type of load limiters has been developed. Such a new load limiter constitutes a separate component to be coupled at one end to the seat belt and at the other end to the vehicle. This kind of load limiter has several advantages compared to conventional load limiters. For example, it is easier to design this type of load limiter to give the seat belt system comprising the load limiter the characteristics desired, such as well defined tensile properties.

However, since the seat belt tension sensor is usually connected between the seat belt and the vehicle, the position suitable for the new type of load limiter is already occupied, and it is problematic how to design the seat belt system while avoiding an increase of the length of the components arranged between the seat belt and the vehicle, or a rearrangement of the seat belt tension sensor at a new position relative the vehicle, i.e. the seat, due to the fact that both the seat belt tension sensor and the load limiter have to be coupled to the seat belt and the vehicle. Particularly, it is important that the components which are coupled to the seat belt, at least the components closest to the seat belt, for example the seat belt tension sensor and its coupling mechanism to the seat belt, can be arranged inside a side panel valance having given dimensions and a given position at the seat to conceal these components.

SUMMARY OF THE INVENTION

An object of the invention is to provide a device of the kind referred to in the introduction which combines a seat belt tension sensor and a load limiter arranged in the same area while maintaining a compact arrangement.

By the provision of a device having one of either the seat belt tension sensor or the load limiter member connectable to a first end of the seat belt and the other of the seat belt tension sensor and the load limiter member connectable to the vehicle, and the seat belt tension sensor and the load limiter member connected to each other so that at least a part of the seat belt tension sensor and a part of the load limiter member overlap with each other, the seat belt tension sensor and the load limiter member are connected in series while enabling the length of the combination of the two components to be less than the sum of the individual length of the seat belt tension sensor and the individual length of the load limiter member.

According to one embodiment of the invention, the seat belt tension sensor and the load limiter member are connected to each other so that a major part of either the seat belt tension sensor or the load limiter member overlaps with the other of the seat belt tension sensor and the load limiter member. In this way the total mounting length of the seat belt tension sensor and the load limiter member is further reduced and the length could be substantially the same as if the components were connected in parallel between the seat belt and a vehicle.

According to another embodiment of the invention, a first end of the seat belt tension sensor is connected to the first end of the seat belt and a second end of the seat belt tension sensor is connected to the load limiter member which is connectable to the vehicle. Hereby, a further advantage is attained in that one part of the load limiter member may be arranged directly on the vehicle, for example on a bracket of the seat, the floor or on a pillar and, thus, there is a greater freedom of designing the load limiting member without affecting the appearance or function of the seat belt at a position higher up on the seat belt.

According to another embodiment of the invention, the seat belt tension sensor and the load limiter member are pivotally connected to each other around a pivot axis. In this way, the overlapping condition can be fulfilled simultaneously as enabling a pivot motion and, thus, adjustment of the seat belt tension sensor relative to the load limiter member when the device is in operation. This is particularly advantageous because this means that the sensor can follow the movements of the seat belt when a child seat is mounted and thereby be directed substantially in the longitudinal direction of the seat belt for different directions of the seat belt. For ensuring that the sensor always provides a reliable signal to be used for the decision to disconnect or not disconnect an airbag, it is important that substantially the whole load transferred to the seat belt due to the mounting of a child seat is also transferred to the seat belt tension sensor. If only a part of the load is transferred, which may be the case if the sensor and the seat belt have different directions, the signal from the sensor may be misleading.

According to a further embodiment of the invention, the device has a means for impeding pivot motion of the seat belt sensor relative the load limiter member, at least in one direction, beyond a predetermined angle compared to a standard position and the direction in which the pivot motion is impeded at the predetermined angle is opposite to a direction in which the pivot motion is counteracted by a spring force. Hereby a relative pivot motion between the sensor and the load limiter member within a decided angle interval in operation is achieved simultaneously as the mounting of the seat belt device in the production line is simplified since by means of the spring force acting against the predetermined angle, it is possible to temporarily fix the relative positions of the sensor and the load limiter member when the device is handled.

According to yet another embodiment of the invention, the load limiter member has a first component and a second component designed as a hook clasping the first component, the second component being designed to be deformed and thereby release the first component when the tension in the seat belt exceeds a predetermined value. Hereby an efficient load limiter member with very well defined characteristics may be obtained and still a very compact device can be achieved.

Further advantages and advantageous features of the device according to the invention are disclosed in the following description and remaining dependent claims.

The invention also relates to a vehicle comprising a device according to the invention.

BRIEF DESCRIPTION OF THE DRAWINGS

With reference to appended drawings below follows a closer description of embodiments of the invention cited as examples.

In the drawings.

DETAILED DESCRIPTION OF PREFERRED EMBODIMENTS OF THE INVENTION

Figure 1:
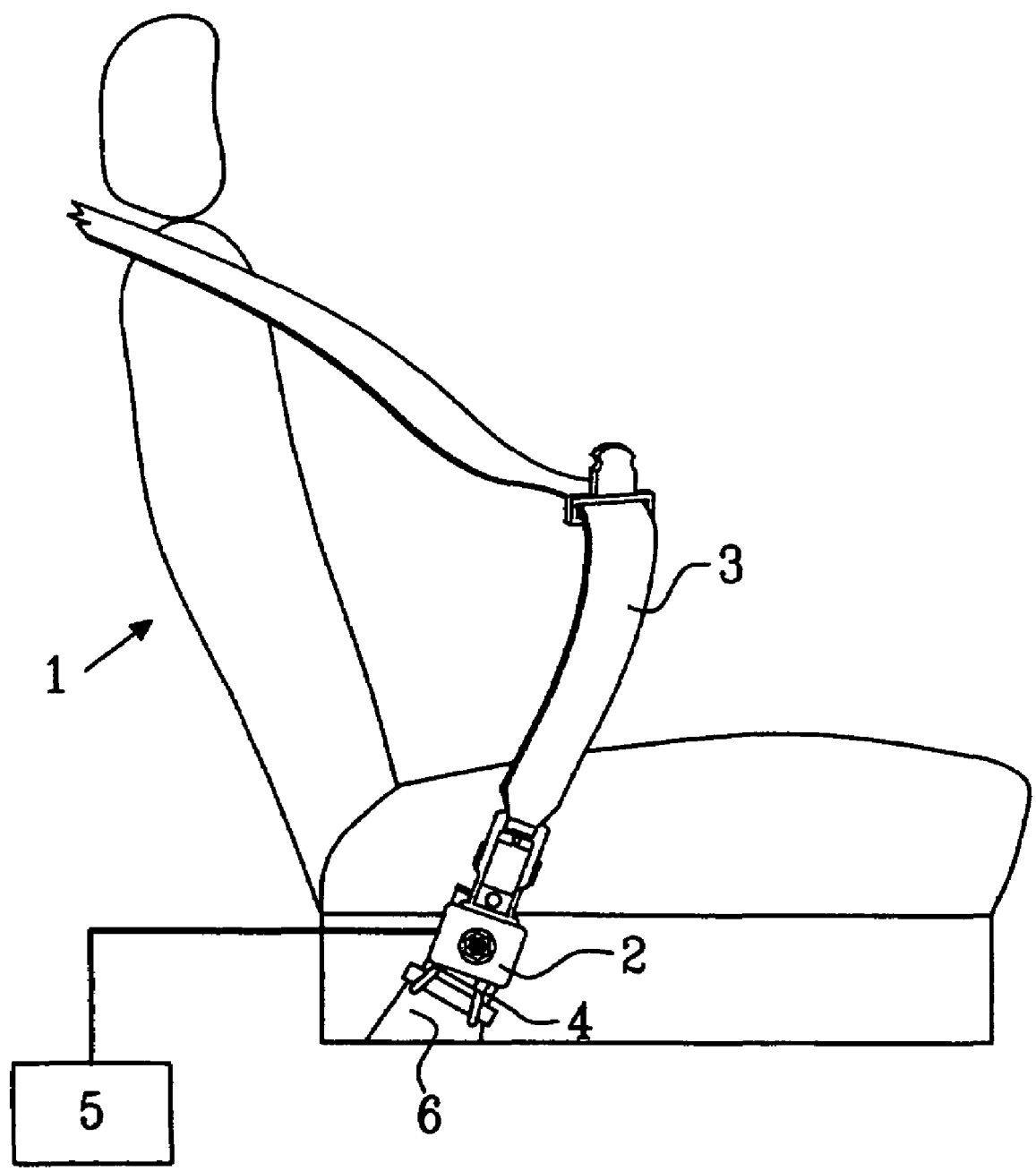
FIG. 1 is a schematic perspective view of the device according to the invention at a seat of a car.

In FIG. 1 a device for use together with a seat belt of a seat in a vehicle according to the invention is schematically illustrated at the passenger seat 1 in a car. The seat belt device comprises a sensor 2 for measuring tension in the seat belt 3 and a member 4 for limiting the load transferable by the seat belt 3. The seat belt tension sensor 2, for example a sensor which works with one or more strain gauges, is arranged to provide information based on which an airbag intended for said seat may be disconnected. For example, an electrical signal proportional to the tension in the seat belt 3 may be transferred to a computer unit 5 or the like controlling the function of an airbag.

Figure 2:
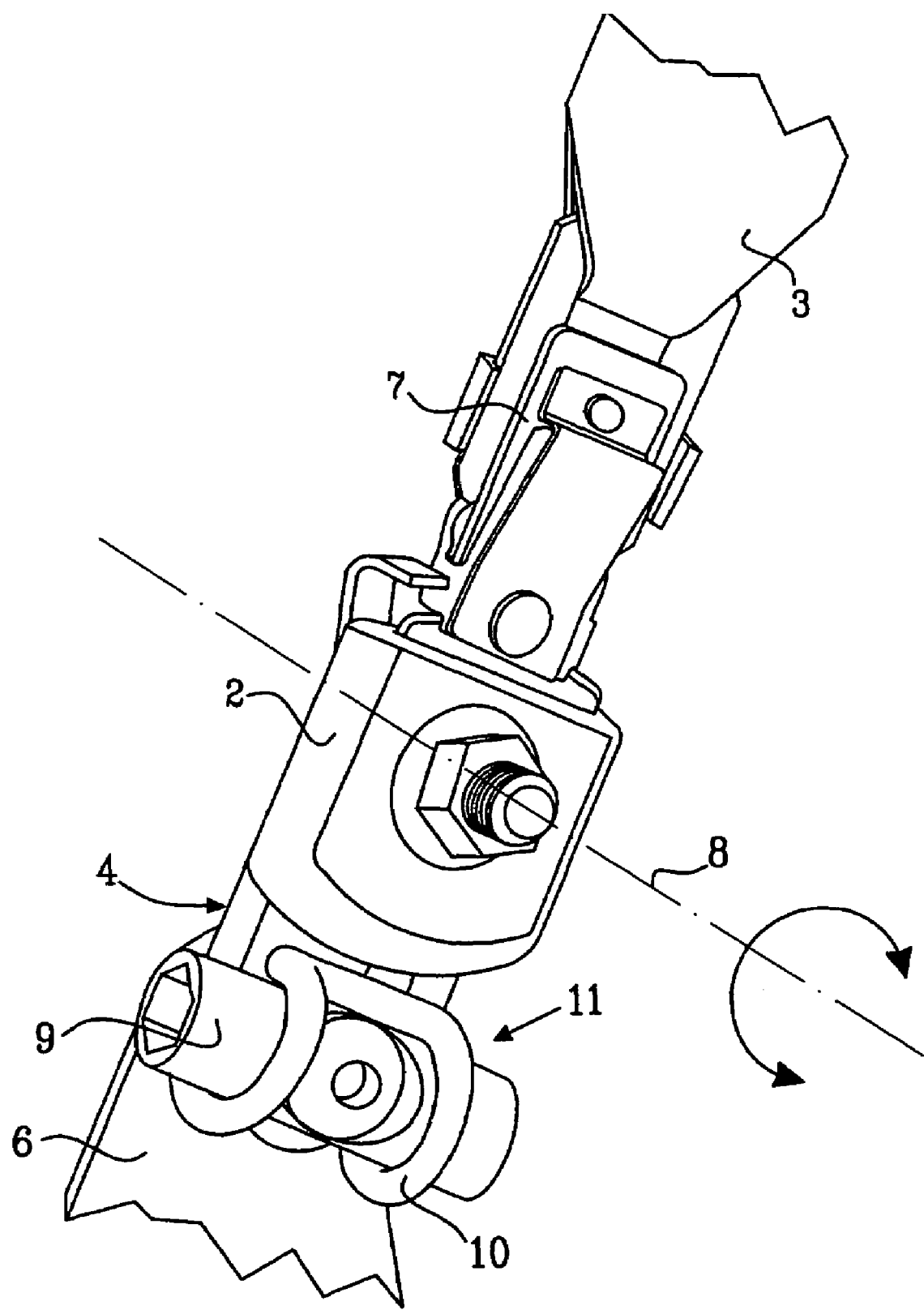
FIG. 2 is a schematic perspective front view of the device.
Figure 3:
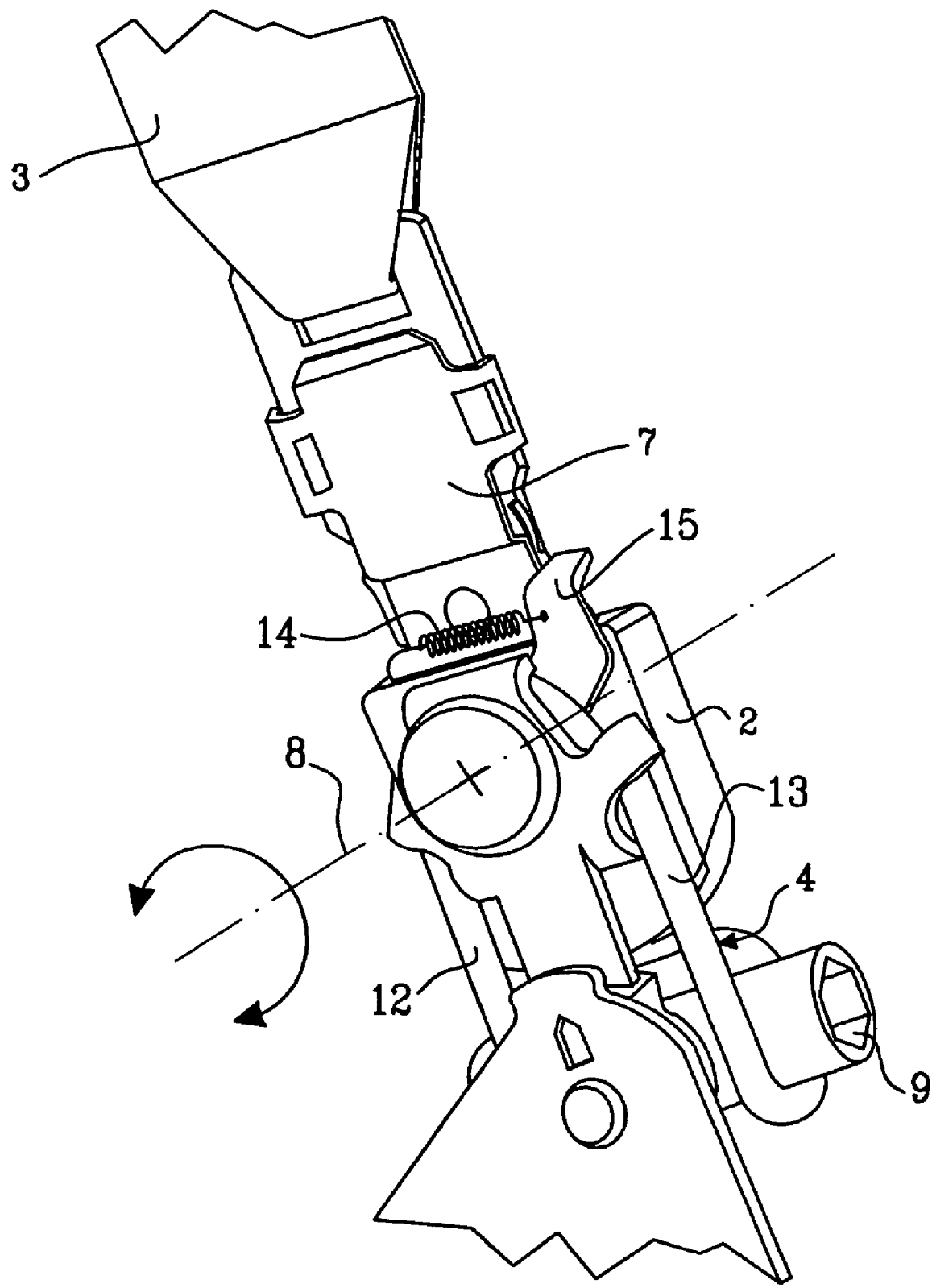
FIG. 3 is a schematic perspective rear view of the device.

As illustrated more in detail in FIGS. 2 and 3, in one embodiment of the invention the seat belt tension sensor 2 is connectable to the seat belt 3 and the load limiter member 4 is connectable to the vehicle 6, although it could be the other way around, i.e. the load limiter member could be connectable to the seat belt and the seat belt tension sensor could be connectable to the vehicle.

Furthermore, the seat belt tension sensor 2 and the load limiter member 4 are connected to each other so that at least a part of the seat belt tension sensor 2 and a part of the load limiter member 4 overlap with each other. Preferably, the seat belt tension sensor 2 and the load limiter member 4 are connected to each other so that a major part of the shorter of the seat belt tension sensor 2 and the load limiter member 4, i.e. the seat belt tension sensor 2 in the illustrated example, overlaps with the longer one, i.e. the load limiter member 4 in the illustrated example. Preferably, more than 70% of the seat belt tension sensor 2 overlaps with the load limiter member 4, and more preferably more than 90% of the seat belt tension sensor 2 overlaps with the load limiter member 4. Of course, the device becomes more compact in the length direction of the seat belt the more the seat belt tension sensor 2 and the load limiter member 4 overlap, and in the illustrated embodiment substantially the whole active part of the seat belt tension sensor 2, i.e. the lower part and not the upper part constituting the attachment means 7 for connecting to the seat belt, overlaps with the load limiter member 4. In this way the length of the combination of the seat belt tension sensor 2 and the load limiter member 4 is substantially determined by the length of the load limiter member 4. If, however, the seat belt tension sensor and the load limiter member are substantially of the same length the overlapping part of each of them is of course of the same size.

In the embodiment illustrated, the seat belt tension sensor and the load limiter member are pivotally connected to each other about a pivot axis 8. The pivot motion enables adjustment of the seat belt tension sensor 2 relative to the load limiter member 4 when the device is in operation. This is particularly advantageous because this means that the seat belt tension sensor 2 can follow the movements of the seat belt 3 when a child seat is mounted and thereby be directed substantially in the longitudinal direction of the seat belt 3 for different directions of the seat belt 3. In case the seat belt tension sensor is connected to the vehicle and the load limiter member to the seat belt, the seat belt tension sensor and the load limiter are preferably fixed to each other and the seat belt tension sensor is pivotally connectable to the vehicle instead to obtain the corresponding possibility to follow the movements of the seat belt.

In accordance with the description above, preferably, the major part of the seat belt tension sensor 2, except for the attachment means 7, is arranged on the same side of said pivot axis 8 as that part of the load limiter member 4 connected to the vehicle 6.

The first end of the seat belt tension sensor 2 may be connected to the first end of the seat belt through a quick fix or snap in coupling.

The load limiter member 4 may be designed in various ways and further the load limiter member may be connected to a seat bracket, the floor or a pillar of the vehicle. A load limiter member 4 which is comparably thin is advantageous, since the device becomes compact also in the direction perpendicular to the seat belt 3. One embodiment of the load limiter member 4 as illustrated has a first component 9 and a second component 10 designed as a hook 11 clasping the first component 9. The second component 10 is designed to be deformed and thereby release the first component 9 when the tension in the seat belt 3 exceeds a predetermined value. The second component 10 of the load limiter member 4 may comprise two spaced elongated portions 12, 13, such as drawn rods, connected to each other at the tip of the hook 11. The portions 12, 13 of the load limiter member 4 may also be connected to each other in the end of the second component 10 which is connected to the seat belt tension sensor 2 and, thus, the load limiter member 4 forms a closed loop.

Figure 4:
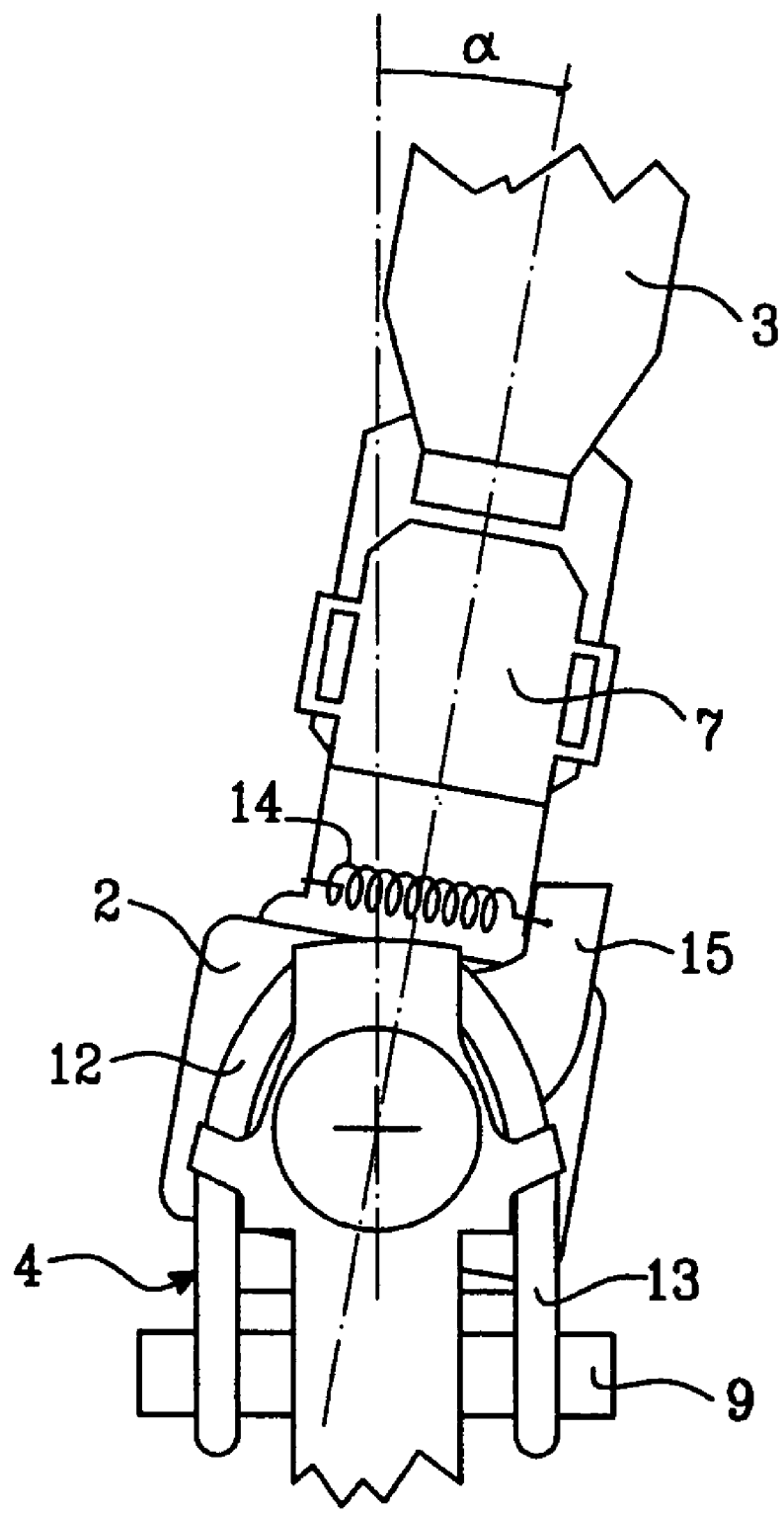
FIG. 4 is a schematic view illustrating an embodiment of the device comprising a spring.

The pivot motion mentioned above is favourable in operation, but in the work shop when the components are to be mounted this is rather a disadvantage and for eliminating this problem, the device according to the invention may be provided with a spring 14 arranged to counteract pivot motion of the seat belt tension sensor 2 relative the load limiter member 4 in one direction. To prevent pivot motion in the other direction the device may have means 15 for impeding, such as a mechanical end stop 15 or the like, pivot motion of the seat belt tension sensor 2 relative the load limiter member 4 beyond a predetermined angle α from a standard position. The standard position is suitable chosen so that the seat belt 3 and the seat belt tension sensor 2 are substantially aligned as illustrated in FIG. 4 and the predetermined angle α as well as the spring force should be chosen so as not to affect the need of pivot motion adversely when the device is in operation together with the seat belt 3. For example, the angle could be in the interval 5–30°, and preferably the angle is approximately 10°. Pivot motion in the other direction to a corresponding angle, i.e. counter clockwise in FIG. 4, should be possible by overcoming the spring force.

It is to be understood that the present invention is not limited to the embodiments described above and illustrated in the drawings; rather, the skilled person will recognize that many changes and modifications may be made within the scope of the appended claims. For example the dimensions and the material of the components comprised in the device according to the invention may be varied in many ways.

The invention claimed is:

1. A device for use together with a seat belt of a seat in a vehicle, comprising a sensor for measuring tension in the seat belt and a member for limiting the load transferable by the seat belt, the seat belt tension sensor being arranged to provide information based on which an airbag intended for said seat may be disconnected wherein one of either the seat belt tension sensor or the load limiter member is connectable to a first end of the seat belt and the other of the seat belt tension sensor and the load limiter member is connectable to the vehicle, the seat belt tension sensor and the load limiter member being connected to each other so that at least a part of the seat belt tension sensor and a part of the load limiter member overlap with each other.

2. A device according to claim 1 wherein the seat belt tension sensor and the load limiter member are connected to each other so that a major part of either the seat belt tension sensor or the load limiter member overlaps with the other of the seat belt tension sensor and the load limiter member.

3. A device according to claim 1 wherein a first end of the seat belt tension sensor is connectable to the first end of the seat belt and a second end of the seat belt tension sensor is connected to the load limiter member which is connectable to the vehicle.

4. A device according to claim 3 wherein the seat belt tension sensor and the load limiter member are pivotally connected to each other around a pivot axis.

5. A device according to claim 4 wherein pivot motion of the seat belt tension sensor relative the load limiter member is counteracted in one direction by a spring force.

6. A device according to claim 4 wherein the device has an end stop impeding pivot motion of the seat belt sensor relative the load limiter member, at least in one direction, beyond a predetermined angle from a standard position.

7. A device according to claim 6 wherein said angle is in the interval 5–30°.

8. A device according to claim 7 wherein said angle is approximately 10°.

9. A device according to claim 4 wherein the major part of the seat belt tension sensor is arranged on the same side of said pivot axis as that part of the load limiter member connectable to the vehicle.

10. A device according to claim 3 wherein the first end of the seat belt tension sensor is connectable to the first end of the seat belt through a quick fix or snap in coupling.

11. A device according to claim 1 wherein the load limiter member has a first component and a second component designed as a hook clasping the first component, the second component being designed to be deformed and thereby release the first component when the tension in the seat belt exceeds a predetermined value.

12. A device according to claim 11 wherein the second component of the load limiter member comprises two spaced elongated portions connected to each other at the tip of the hook.

13. A device according to claim 1 wherein a first end of the load limiter member is connectable to the first end of the seat belt and a second end of the load limiter member is connected to the seat belt tension sensor which is connectable to the vehicle.

14. A device according to claim 13 wherein the seat belt tension sensor is pivotally connectable to the vehicle.

* * * * *